INVENTORS
FRANCIS M. SANO
WALTER PARFOMAK
BY Roland Plottel
ATTORNEY

INVENTORS
FRANCIS M. SANO
WALTER PARFOMAK
BY Roland Plottel
ATTORNEY

United States Patent Office 3,239,685
Patented Mar. 8, 1966

3,239,685
CONTROL CIRCUIT

Francis M. Sano, Paterson, N.J., and Walter Parfomak, Brooklyn, N.Y., assignors to The Bendix Corporation, Teterboro, N.J., a corporation of Delaware
Filed Sept. 18, 1962, Ser. No. 224,363
10 Claims. (Cl. 307—88.5)

The invention relates generally to a multipurpose electric circuit having application, for example, as a phase demodulator, and as a constant phase amplifier.

The term phase demodulator as used herein, includes a circuit capable of determining whether two alternating signals are in phase, i.e., 0° phase angle difference between the signals, out of phase, i.e., 180° phase angle difference between the signal, in quadarature, i.e., 90° phase angle difference between the signals, and also includes a circuit capable of determining any intermediate amount of phase angle difference between the signals.

One object of the invention is to provide a novel general purpose electric circuit capable of providing, for example, constant phase amplification and phase demodulation.

Another object of the invention is to provide a novel circuit capable of providing constant phase amplification and phase demodulation operable at variable frequencies and at higher frequencies.

Another object of the invention is to provide a novel constant phase amplifier supplying a fixed phase output signal varying in amplitude in accordance with the amplitude of an input signal and whose phase is insensitive to changing phase of the input signal.

Another object of the invention is to provide a novel circuit providing an output signal in accordance with the phase angle difference between a reference signal and a phase displaced signal.

Another object of the invention is to provide a novel phase angle demodulator providing a full wave rectified output signal, which signal is well adapted to be filtered providing a D.C. signal with a small ripple content or adapted to directly drive small D.C. motors, relays, and electromagnetic devices.

Another object of the invention is to provide a novel phase demodulator having good sensitivity and isolation between a reference signal and a phase displaced signal.

Another object of the invention is to provide a novel phase angle demodulator with good efficiency consuming no power during stand-by and very little power internally during operation.

Another object of the invention is to provide a novel circuit producing an output signal having zero output when the inputs are in quadrature and an output varying in polarity and amplitude in accordance with the amount of deviation from quadrature.

Another object of the invention is to provide a novel circuit producing an output signal of one polarity where the inputs are in phase, and an output signal of opposite polarity when the inputs are out of phase.

The foregoing and other objects and advantages of the invention will appear more fully hereinafter from a consideration of the detailed description which follows, taken together with the accompanying drawings where in several embodiments of the invention are illustrated by way of example. It is to be expressly understood, however, that the drawings are for illustration purposes only and are not to be construed as defining the limits of the invention.

Figure 1:
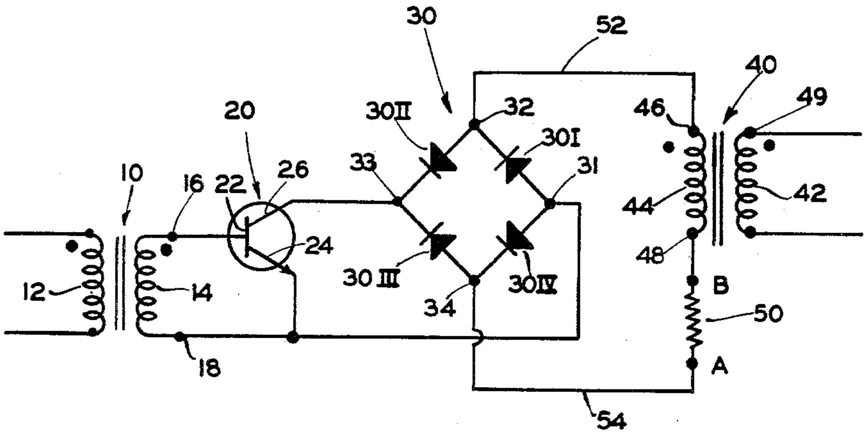
FIGURE 1 is a schematic drawing showing a basic electric circuit constructed in accordance with the invention.

In FIGURE 1, there is shown a first transformer 10 having a primary winding 12 adapted to receive a first alternating input signal and having a secondary winding 14 with two terminals 16 and 18. Transformer 10 is dotted in a conventional fashion to indicate those terminals of the windings whose potential rise and fall together.

A transistor 20 is connected to transformer 10 with a base 22 connected to terminal 16 and an emitter 24 connected to terminal 18. Transistor 20 is rendered conducting for positive excursions of the input signal, because terminal 16 and base 22 are at a higher potential than terminal 18 and emitter 24. Transistor 20 is in a nonconducting state during negative excursions of the input signal because terminal 16 and base 22 are at a lower potential than terminal 18 and emitter 24.

A rectifying bridge 30 is connected across transistor 20 from a collector 26 to emitter 24. Bridge 30 has four terminals 31, 32, 33, and 34, and four rectifiers 30I, 30II, 30III, and 30IV, one in each of its four legs. The rectifiers 30I through 30IV are connected to provide two forward unidirectional conducting paths between opposite terminals 31 and 33. Terminals 31 and 33 are connected respectively to terminal 18 and collector 26.

It will be appreciated that with the circuit as just described, there are no conducting paths through transistor 20 and/or bridge 30; since when transistor 20 is in a conducting state, rectifying bridge 30 is backbiased; and when rectifying bridge 30 is forward-biased, transistor 20 is a nonconducting state.

A second transformer 40 is connected to bridge 30 and has a primary winding 42 adapted to receive a second signal and a secondary winding 44 with two terminals 46 and 48. A terminal 49 of primary winding 42, and terminal 46 of secondary winding 44 are dotted, according to the convention, indicating that the potential at terminals 46 and 49 rises and falls together. The potential at terminal 48 is 180° phase shifted from the applied signal.

Secondary winding 44 is serially connected to an output or a load shown here as a resistor 50 having two terminals A and B. The series combination of the winding 44 and resistor 50 is connected by conductors 52 and 54 to the other two opposite terminals 32 and 34 of bridge 30.

If a first signal applied to transformer 10 and a second signal applied to transformer 40 are in phase, a current flows across resistor 50 from A to B. If the two signals are 180° out of phase, a current flows across resistor 50 in the opposite direction from B to A.

The operation of the circuit may be traced in detail as follows: during the positive alternation of the first signal, base 22 is at a higher potential than emitter 24, and transistor 20 is rendered conducting. If the second signal applied to transformer 40 is of the same phase, a current flows from terminal 46 through conductor 52 through rectifier 30II to collector 26 of transistor 20 out through emitter 24 to terminal 31 and then through rectifier 30IV through conductor 54 through resistor 50 from terminal A to B to the negative terminal 48 of secondary winding 44. It should be noted that the direction of current flow across resistor 50 is from A to B when the first and second signals are in phase.

If the second signal applied to transformer 40 is of opposite phase, i.e., 180° out of phase with the first signal applied to transformer 10, a current will flow in the opposite direction from B to A across resistor 50. This may be verified by tracing the current flow. Terminal 48 of winding 44 is at a higher potential than terminal 46 and current flows from terminal 48 through resistor 50 from B to A through conductor 54 to terminal 34 of bridge 30, through rectifier 30III to terminal 33, through transistor 20 from collector 26 to emitter 24, to terminal 31, through rectifier 30I to terminal 32 and through conductor 52 to the opposite side 46 of secondary winding 44. Thus, when the input signals are in phase or opposite phase, the output signals are of the same amplitude but of opposite polarity.

The secondary windings 14 and 44 on either or both of the transformers 10 and 40 may be reversed without impairing the efficacy of the circuit. Also, an equivalent basic circuit is attained when both transistor 20 is of an opposite conducting type, namely PNP, and the polarity of all rectifiers in rectifying bridge 30 are reversed.

When the input signals are exactly 90° out of phase, there is no net output across resistor 50. During each positive excursion of the first input signal that renders transistor 20 conducting, the second input signal impresses an equally positive and negative signal on transformer 40 that sums to zero across resistor 50. Thus, when the signals are in quadrature, there is no output across load 40.

Figure 2:
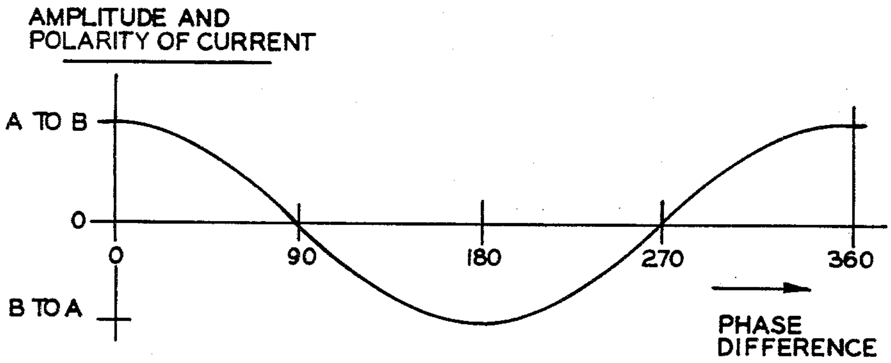
FIGURE 2 is a graph showing the relationship between the amplitude-polarity of an output signal as a function of the phase difference between two input signals.

When the phase difference of the input signals is other than quadrature, out of phase, or in phase, the amplitude and polarity of the output signal is proportional to the amount of phase difference. The relationship is shown in the graph of FIGURE 2 wherein amplitude-polarity is shown on the ordinate, and phase angle difference between the input signals is shown on the abscissa. For 0° phase difference, there is a maximum output signal across resistor 50 from A to B. As the phase difference increases to 90°, the amplitude decreases to zero. As the phase difference varies between 90° and 270°, the polarity of output signal changes reaching a maximum at 180°. Finally, as the phase varies between 270° and 360°, the polarity of output signal again changes and the signal increases in amplitude from zero at 270° to a maximum at 360°.

The shape of the amplitude-polarity curve depends upon the choice of components and the class of service at which transistor 20 is biased. If the circuit is to be used for in and out of phase detection, transistor 20 may be biased for class C service, so that only the positive and negative peaks appear across load 50. If the circuit is to be used for quadrature detection, transistor 20 would be biased for class A-B service to provide a large as possible difference in amplitude in the vicinity of 90° and 270°.

With the circuit of FIGURE 1, the useful output signal across resistors 50 is at most a half wave rectified signal and for many applications, such as driving a D.C. motor, or relay, or for that matter, any load that requires a substantial D.C. signal without excessive ripple, this type of signal is not satisfactory. Also, the circuit of FIGURE 1 is not efficient in that only half of the signal and one quarter of the power of the second input signal is delivered to the load.

Figure 3:
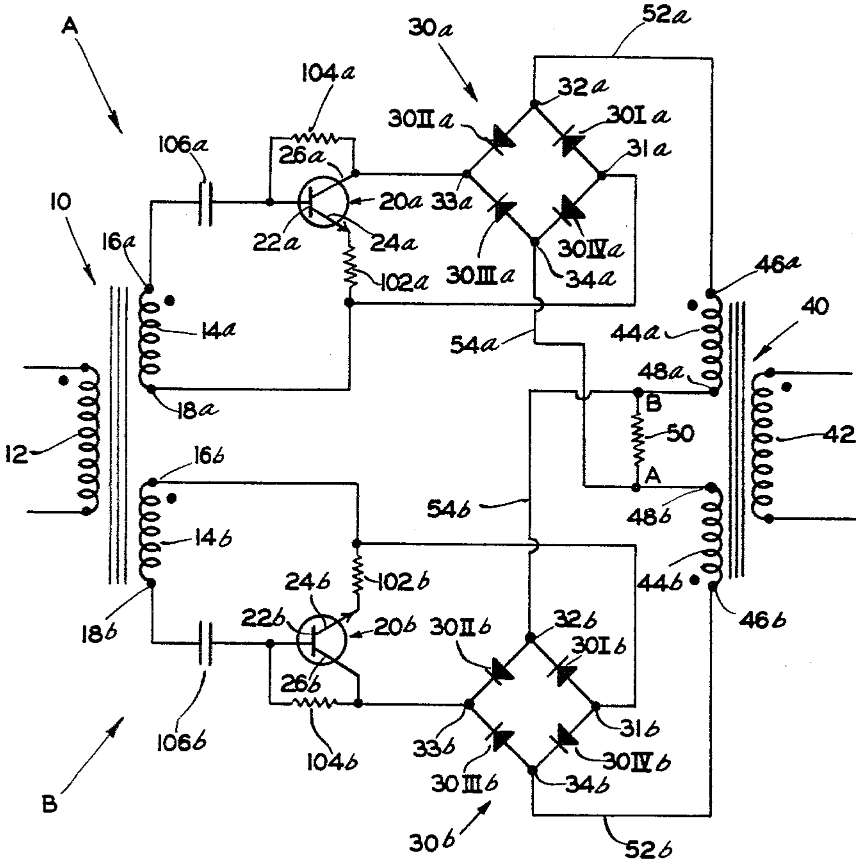
FIGURE 3 is a schematic drawing showing a preferred embodiment of an electrical circuit constructed in accordance with the invention.

A preferred embodiment of the invention is shown in the schematic drawing of FIGURE 3 and incorporates the basic circuit of FIGURE 1. The circuit of FIGURE 2, for in and out of phase signals, provides a full wave rectified output signal capable of driving most D.C. motors, relays, and other inductive devices without difficulty. The full wave rectified output signal lends itself nicely to being filtered to provide a D.C. signal with a small ripple content. Moreover, the full wave rectified output signal is efficient from the power point of view in that the power transfer ratio of available power at the output resistor 50 to the input power of the second signal at transformer 40 can be in the neighborhood of 90 percent. This may be contrasted with the power transfer ratio of a half wave rectified circuit which is less than 25 percent.

FIGURE 3 includes two basic circuits, A and B, shown in FIGURE 1, connected in push-pull configurations. Elements that are common to both figures bear the same legend, but in FIGURE 3 are postscripted with an *a* or *b* to indicate their proper location in the circuit.

In FIGURE 3 there is shown first transformer 10 having a primary winding 12 adapted to receive one signal and two secondary windings **14*a* and 14*b* electrically insulated from each other. Both secondary windings 14*a* and 14*b* are dotted in the conventional fashion to indicate two positive terminals 16*a* and 16*b* and two negative terminals 18*a* and 18*b*. Two transistors 20*a* and 20*b* are connected with their bases 22*a* and 22*b* to terminals 16*a* and 18*b* respectively, and with their emitters 24*a* and 24*b* connected respectively to terminals 18*a* and 16*b***.

Emitter resistors **102*a* and 102*b* are connected respectively between emitters 24*a* and 24*b* and terminals 18*a* and 16*b* to provide impedance matching between the source (not shown) of the first input signal and transformer 10**.

Transistors **20*a* and 20*b* are here described as being biased for class B service because class B is most economical from the power point of view, and provides a nice push-pull full wave rectified output. As noted above, other classes of service may be used to advantage. Two bias resistors 104*a* and 104*b* are connected respectively between collectors 26*a* and 26*b* and bases 22*a* and 22*b* and in class B service cause transistors 20*a* and 20*b* to conduct immediately upon the application of a signal by compensating for any dead space at the transistor junction. Resistors 104*a* and 104*b* are most useful with silicon transistors which have a dead space of as much as one half a volt, but may be dispensed with if germanium transistors are used, as they have a dead space of only 2 or 3 millivolts. The need for these resistors for dead space compensation depends to some extent upon the size of the signal available at secondary windings 14*a* and 14*b* and the sharpness of the switching required. Resistors 104*a* and 104*b*, in addition to compensating for dead space, may be used to bias transistors 20*a* and 20*b*** for class A-B, or C service.

If resistors **104*a* and 104*b* are included, two blocking capacitors 106*a* and 106*b* must be connected respectively between bases 20*a* and 20*b* and terminals 16*a* and 18*b* to block any D.C. component available at collectors 26*a* and 26*b* from bypassing the transistors and passing through secondary windings 14*a* and 14*b***.

The rectifying bridges **30*a* and 30*b*** are the same in FIGURE 3 as in FIGURE 1.

The second transformer 40 has a single primary 42 and two secondary windings **44*a* and 44*b*, each shown dotted in accordance with the dot convention, and having two positive terminals 46*a* and 46*b* and two negative terminals 48*a* and 48*b*. Secondary windings 44*a* and 44*b* are connected to each other through an output shown as having load resistor 50 with two terminals A and B. The operation of the circuit is similar to the operation described above in connection with FIGURE 1. For a positive alternation of the first signal at transformer 10, transistor 20***a* is in a conducting state, and transistor 20*b* is in a nonconducting state. When the second signal applied at transformer 40 is in phase with the first signal, a positive signal flows across load 50 from A to B through transistor 20*a* and bridge 30*a* as outlined above. When the second signal is out of phase with respect to the first signal, a positive signal flows across load 50 from B to A through transistor 20*a* and bridge 30*a* as outlined above.

For the negative alternation of the first signal, transistor 20*b* is rendered conducting and transistor 20*a* nonconducting. When the second signal is in phase with the first, a positive signal again flows across load 50 from A to B but through transistor 20*b* and bridge 30*b*. This may be traced in detail as follows: potential at terminal 48*b* is higher than the potential at terminal 46*b* and current flows across load resistor 50 from A to B to terminal 32*b* across rectifier 30II*b* to terminal 33*b* across transistor 20*b* from collector 26*b* to emitter 24*b* through impedance matching resistor 102*b* and conductor 54*b* to terminal 31*b* through rectifier 30IV*b* and conductor 52*b* to terminal 46*b*.

Likewise, during the negative alternation of the first signal, when the second signal applied at transformer 40 is out of phase with respect to the first signal, a positive signal flows through transistor 20*b* and bridge 30*b* and across load resistor 50 in the opposite direction, viz: from B to A.

It should be noted that by conducting the second signal through the "*a*" circuit during the positive alternation of the first signal, and through the "*b*" circuit during the negative alternation, a full wave rectified signal is applied across the load 50. Furthermore, the input and output signals are isolated from each other, and the *a* and *b* circuits are electrically insulated from each other except for a common output 50.

The circuit has been shown with transistor 20 biased for class B amplifier service. The circuit will perform satisfactorily with the transistors biased at any other class of service. For example, a slightly sharper switching action can be obtained by biasing the transistors in class A-B service but with a corresponding decrease in power efficiency.

The circuit has been shown with two NPN transistors, 20*a* and 20*b*, with rectifiers 30*a* and 30*b* in a particular configuration, and with the transformers 10 and 40 dotted in a particular fashion. One or both of the transistors may be of opposite conducting type, namely PNP, and the rectifiers in the bridge may be turned around, and the transformer windings may be reversed without departing from the scope and spirit of the invention. For example, when reversing secondary winding 14*b*, and by using a PNP transistor for 20*b*, and by turning around all the rectifiers in bridge 30*b*, an equivalent circuit is obtained. As a further example, both secondary windings of either or both transformers 10 and 40 may be reversed and still attain an equivalent operation.

The circuit shown in FIGURE 3 can supply a constant phase signal to load 50 by reversing a single winding in one of the secondaries (44*a* or 44*b*) of second transformer 40. The circuit as so amended provides alternating signals to load 50 varying only in amplitude and in accordance with the amplitude of the first signal applied to transformer 10. The output signal is of constant phase regardless of the phase variations of a first signal applied at transformer 10. An application for such circuit may be in a control system to drive a D.C. servo motor. Formerly, the signal available across resistor 50 would be filtered to drive the D.C. servo. However, filtering introduces a small time delay; and where such a delay is intolerable, an A.C. motor, of for example, a two phase induction type that requires an amplitude varying but phase constant signal, would be used.

There are many different values of circuit parameters for which the circuit shown in FIGURE 2 will function satisfactorily. Since the circuit parameters may vary according to the design for any particular application, the following circuit parameters are included for the circuit of FIGURE 3 by way of example only.

Transformer 10: 3:1 step down
Transformer 40: 115:47 step down
Rectifiers in bridge 30: 1N645
Resistor 50: 100Ω 7.*w*
Resistor 102: 10Ω .5*w*
Resistor 104: 75K .25*w*
Capacitor 106: 5.6 μf.
First input signal: 6 v., 400 c.p.s.
Second input signal: 115 v., 400 c.p.s.

While several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A circuit for measuring the phase difference between two alternating signals of the same frequency, comprising a transformer having a primary winding receiving one alternating signal and having a secondary winding, a transistor having input and common electrodes connected to the secondary winding and rendered conducting by the signal during part of each cycle and having an output electrode, a rectifying bridge having a rectifier in each leg and two pairs of opposing terminals and connected with one pair of opposing terminals to the output and common electrodes of the transistor, a second transformer having a primary winding receiving the other signal and having a secondary winding, and an output load connected in series with the secondary winding of the second transformer across the other pair of opposing terminals of the rectifying bridge and providing a voltage varying in polarity and amplitude in accordance with the phase difference between the two signals.

2. A circuit for measuring the phase difference between two alternating signals of the same frequency, comprising a transformer having a primary winding receiving one alternating signal and a pair of secondary windings electrically insulated from each other, a pair of transistors having input and common electrodes connected to the secondary windings and arranged in push-pull configuration, the transistors being responsive to the one alternating signal and also having output electrodes, a pair of rectifying bridges each having a rectifier in each leg and two pairs of opposing terminals, the bridges having one pair of opposing terminals connected to the common and output electrodes of the transistors, a second transformer having a primary winding receiving the other alternating signal and having a pair of secondary windings, and a common load connected in series with each secondary winding across the other pair of opposing terminals of each rectifying bridge and energized by a direct current voltage varying in polarity and amplitude in accordance with the phase difference between the two signals.

3. A circuit comprising a transformer having a primary winding receiving a first alternating signal and having a secondary winding, a transistor having a base and an emitter connected to the secondary winding and energized by the one alternating signal and rendered conducting during part of each cycle of the signal and having a collector, a rectifying bridge having four terminals, one terminal being connected to the collector and an opposite terminal being connected to the emitter, the bridge providing two unidirectional conducting paths between the opposite terminals, and a second transformer having a primary winding receiving a second alternating signal of the same frequency as the first signal and having a secondary winding connected in series with load means to the other two terminals of the bridge to energize the load means by a direct current voltage varying in polarity and amplitude in accordance with the phase difference between the signals.

4. A circuit for indicating the phase relation between two alternating signals of the same frequency, comprising a transformer having a primary winding receiving one signal and having a secondary winding, a transistor having a base and an emitter connected to the secondary winding and rendered conducting during part of each cycle of the signal and having a collector, a capacitor connected between the base and the secondary winding for blocking direct current components, a resistor connected between the secondary winding and the emitter for impedance matching, another resistor connected between the collector and the base for bias, a rectifying bridge having four terminals and connected at one of its terminals to the collector and at an opposite terminal to the secondary winding and having two unidirectional conducting paths between the opposite terminals, a second transformer having a primary winding receiving the second alternating signal and having a secondary winding, load means connected in series with the secondary winding to the other two terminals of the rectifying bridge and energized by a direct current voltage in one direction when the signals are of like phase and in the opposite direction when the signals are of opposite phase.

5. A phase angle demodulator for measuring the phase relation of two like frequency alternating signals, comprising a transformer having a primary winding receiving one signal and a pair of secondary windings electrically insulated from one another and each having first and second terminals, a first transistor having a base connected to the first terminal of one secondary winding and an emitter connected to the second terminal of the same secondary winding and having a collector, a second transistor having a base connected to the second terminal of the other secondary winding and an emitter connected to the first terminal of the same secondary winding and having a collector, said transistors being responsive to the one alternating signal, a pair of rectifying bridges each having first, second, third, and fourth terminals and a rectifier between each pair of terminals and providing two unidirectional conducting paths from the first bridge terminal to the third bridge terminal, the first bridge terminals being connected to the emitters, and the third bridge terminals being connected to the collectors of the transistors, a second transformer having a primary winding receiving the other signal and having a pair of secondary windings electrically insulated from one another and each having first and second terminals, the first terminals of the second transformer being connected to the fourth bridge terminals, a load connected between the second terminals of the second transformers and between the second bridge terminals and energized by a direct current signal varying in polarity and amplitude in accordance with the relative phase of the two alternating signals.

6. A constant phase amplifier comprising a transformer having a primary winding receiving one alternating signal and a pair of secondary windings electrically insulated from one another and each having first and second terminals, a first transistor having a base connected to the first terminal of one secondary winding and an emitter connected to the second terminal of the same secondary winding and having a collector, a second transistor having a base connected to the second terminal of the other secondary winding and an emitter connected to the first terminal of the same secondary winding and having a collector, said transistors being responsive to the one alternating signal, a pair of rectifying bridges each having first, second, third, and fourth terminals and a rectifier between each pair of terminals and providing two unidirectional conducting paths from the first bridge terminal to the third bridge terminals being connected to the emitters and the third bridge terminals being connected to the collectors of the transistors, a second transformer having a primary winding receiving a second alternating signal of the same frequency as the first signal and having a pair of secondary windings electrically insulated from one another and each having first and second terminals, the second terminal of one secondary and the first terminal of the other secondary being connected to the fourth bridge terminals, and an output load connected between the first terminal of the one secondary and the second terminal of the other secondary and between the second bridge terminals and providing a fixed phase signal whose amplitude varies only in accordance with the amplitude of the one signal.

7. An electric circuit comprising a pair of input transformers receiving alternating current signals of the same frequency, a transistor having input and common electrodes connected to one transformer and responsive to the alternating current signal applied to the one transformer and rendered conducting by the alternating current signal during part of each cycle and having an output electrode, a rectifying bridge having a first pair of opposite terminals connected to the common and output electrodes of the transistor and a second pair of opposite terminals connected through a load to the other transformer for providing a direct current output across the load varying in ampiitude and polarity in accordance with the relative phase of the signals.

8. An electric circuit comprising first and second transformers having primary windings receiving alternating signals of the same frequency and each transformer having a pair of secondary windings electrically insulated from one another, a transistor having input and common electrodes connected to each secondary winding of the first transformer, each transistor being responsive to the alternating signal and having an output electrode, a rectifying bridge connected to the common and output electrodes of each transistor, and an output load connected to the secondary windings of the second transformer and to the rectifying bridges to provide a direct current voltage varying in amplitude and phase in accordance with the reltaive phase of the signals.

9. An electric circuit comprising two subcircuits electrically insulated from each other and having a common output load, each subcircuit including a transformer secondary receiving a first alternating signal, a transistor having input and common electrodes connected to the transformer secondary and responsive to the signal and rendered conducting by the signal during part of each cycle and having an output electrode, a rectifying bridge having a first pair of opposite terminals connected to the common and output electrodes of the transistor and having a second pair of opposite terminals, and another transformer secondary receiving another alternating signal of the same frequency as the first signal and connected through the common output load to the second pair of opposite terminals, each subcircuit providing a direct current signal across the output load in accordance with the relative phase of the first and second signals.

10. A circuit for measuring the phase difference between two alternating signals of the same frequency, comprising first and second transformers each having a primary winding receiving an alternating signal and a pair of secondary windings electrically insulated from one another, a transistor having input and common electrodes connected to each secondary winding of the first transformer and responsive to one of the alternating signals and having an output electrode, a rectifying bridge connected to the common and output electrodes of each transistor and to each secondary winding of the second transformer, and an output load connected between the secondary windings of the second transformer and the rectifying bridges and providing a direct current voltage varying in polarity and amplitude in accordance with the phase difference between the two signals.

(References on following page)

References Cited by the Examiner

UNITED STATES PATENTS

| | | | |
|---|---|---|---|
| 2,443,195 | 6/1948 | Pensyl | 329—50 X |
| 2,562,912 | 8/1951 | Hawley | 329—50 X |
| 2,666,136 | 1/1954 | Carpenter | 328—134 |
| 2,774,021 | 12/1956 | Ehret | 307—88.5 X |
| 2,850,649 | 9/1958 | Schroeder | 307—88.5 |
| 2,866,909 | 12/1958 | Trousdale | 307—88.5 |
| 2,945,950 | 7/1960 | Midkiff | 307—88.5 X |
| 3,034,052 | 5/1962 | Estoppey | 329—50 X |
| 3,121,805 | 2/1964 | Pinckaers | 307—88.5 |

FOREIGN PATENTS

| | | |
|---|---|---|
| 814,409 | 6/1959 | Great Britain. |

ARTHUR GAUSS, *Primary Examiner.*

JOHN W. HUCKERT, *Examiner.*